United States Patent
Hirosawa

(10) Patent No.: US 9,804,432 B2
(45) Date of Patent: Oct. 31, 2017

(54) LIQUID CRYSTAL DISPLAY DEVICE

(71) Applicant: Japan Display Inc., Minato-ku (JP)

(72) Inventor: Jin Hirosawa, Tokyo (JP)

(73) Assignee: Japan Display Inc., Minato-ku (JP)

( * ) Notice: Subject to any disclaimer, the term of this patent is extended or adjusted under 35 U.S.C. 154(b) by 237 days.

(21) Appl. No.: 14/715,969

(22) Filed: May 19, 2015

(65) Prior Publication Data

US 2015/0346572 A1 Dec. 3, 2015

(30) Foreign Application Priority Data

May 29, 2014 (JP) ................................. 2014-111502

(51) Int. Cl.
*G02F 1/1343* (2006.01)
*G02F 1/1335* (2006.01)
*G02F 1/1362* (2006.01)

(52) U.S. Cl.
CPC .. *G02F 1/133514* (2013.01); *G02F 1/134363* (2013.01); *G02F 1/1362* (2013.01); *G02F 2001/134372* (2013.01); *G02F 2201/52* (2013.01)

(58) Field of Classification Search
USPC ........................................................ 349/109
See application file for complete search history.

(56) References Cited

U.S. PATENT DOCUMENTS

| | | | |
|---|---|---|---|
| 2007/0146608 A1* | 6/2007 | Jin | G02F 1/133514 349/143 |
| 2009/0190358 A1 | 7/2009 | Tye et al. | |
| 2011/0181634 A1 | 7/2011 | Higashi et al. | |
| 2013/0038798 A1* | 2/2013 | Takata | G02F 1/133603 348/725 |

FOREIGN PATENT DOCUMENTS

| | | |
|---|---|---|
| JP | 2009-109820 | 5/2009 |
| JP | 2011-154321 | 8/2011 |
| JP | 2012-118538 | 6/2012 |

* cited by examiner

*Primary Examiner* — Wen-Ying P Chen
(74) *Attorney, Agent, or Firm* — Oblon, McClelland, Maier & Neustadt, L.L.P.

(57) ABSTRACT

According to one embodiment, a liquid crystal display device includes a first substrate includes a first pixel electrode which comprises a first contact portion and a first strip electrode with a first length, a second pixel electrode which comprises a second contact portion located on a same straight line with the first contact portion and a second strip electrode with a second length equal to the first length, and a third pixel electrode which comprises a third contact portion disposed at a position displaced from the same straight line of the first contact portion and a third strip electrode with a third length different from the first length, a second substrate, and a liquid crystal layer held between the first substrate and the second substrate.

19 Claims, 7 Drawing Sheets

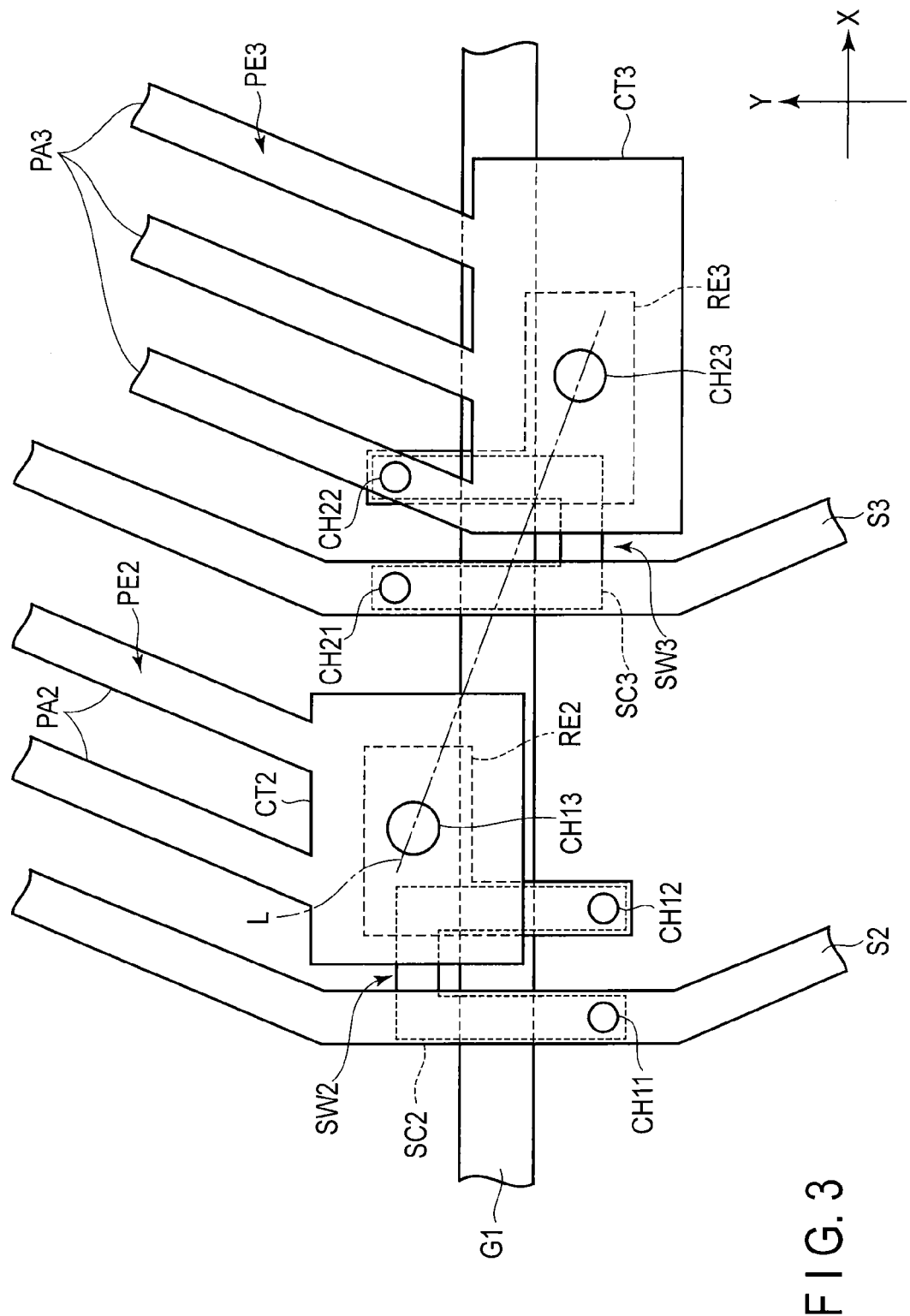
F I G. 3

LIQUID CRYSTAL DISPLAY DEVICE

CROSS-REFERENCE TO RELATED APPLICATIONS

This application is based upon and claims the benefit of priority from Japanese Patent Application No. 2014-111502, filed May 29, 2014, the entire contents of which are incorporated herein by reference.

FIELD

Embodiments described herein relate generally to a liquid crystal display device.

BACKGROUND

Recently, a liquid crystal display device using a lateral electric field (including a fringing field) such as an in-plane switching (IPS) mode has been put into practical use. Such a liquid crystal display device of the lateral electric field mode comprises a pixel electrode and a common electrode formed on one of substrates.

In the liquid crystal display device of the lateral electric field mode, technology of uniforming properties of pixels of respective colors has been known. The pixels of respective colors have pixel areas different in color. The area ratios of the pixel electrodes to respective pixel areas are different from each other.

In addition, technology of reducing the lowering of the resolution without increasing the number of wiring lines has been known. The display device has white sub-pixels besides red, green and blue sub-pixels. The area of each of the red and blue sub-pixels is approximately twice as large as the area of each of the green and white sub-pixels. The number of each of the green and white sub-pixels is twice as great as the number of each of the red and blue sub-pixels.

BRIEF DESCRIPTION OF THE DRAWINGS

FIG. 3 is a plan view schematically showing a structure example of switching elements SW2 and SW3 shown in FIG. 2.

DETAILED DESCRIPTION

Figure 1:
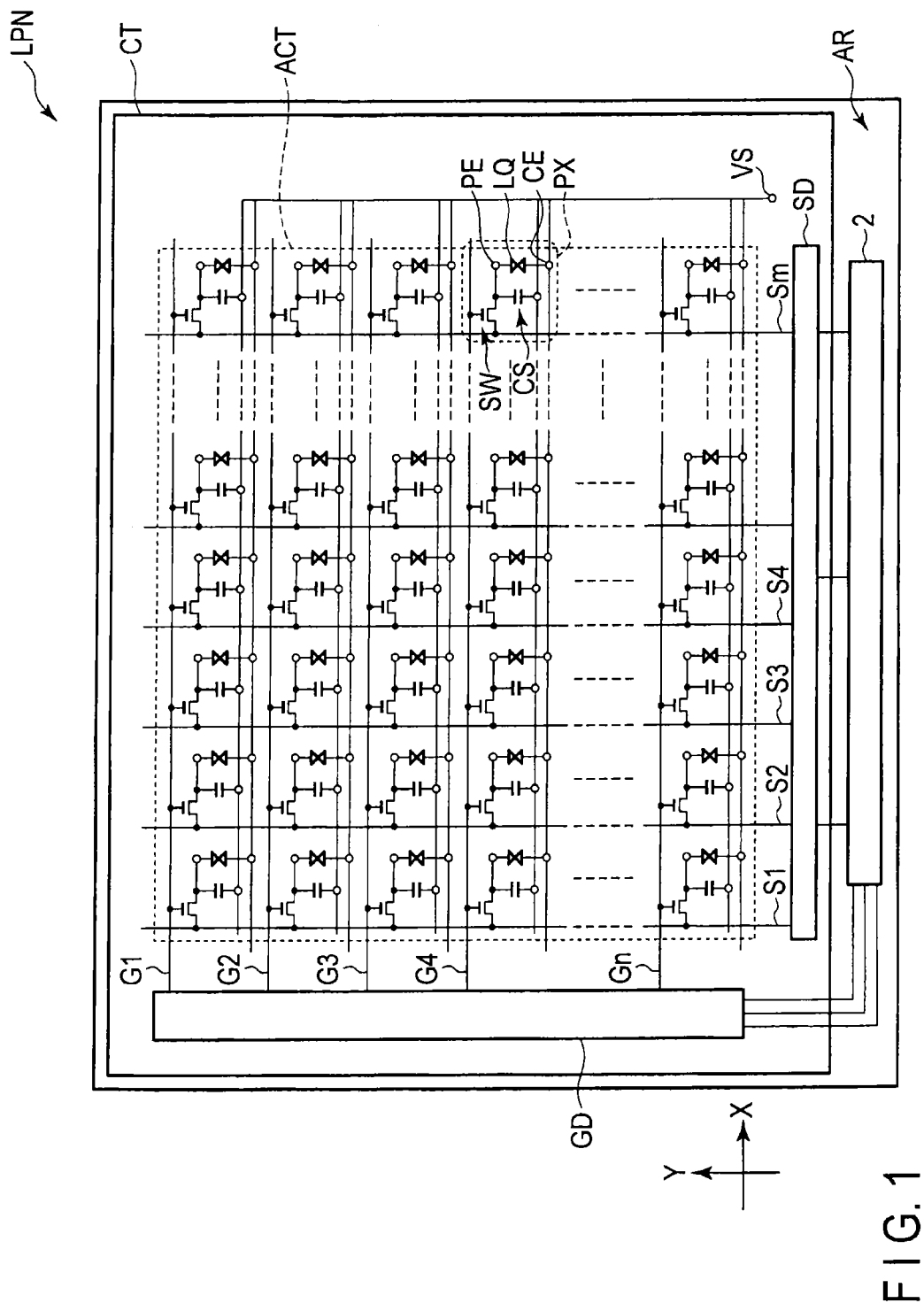
FIG. 1 is a view schematically showing a configuration and an equivalent circuit, of a liquid crystal display panel LPN which constitutes a display device of embodiments.

In general, according to one embodiment, a liquid crystal display device includes: a first substrate comprising first to third switching elements, a first pixel electrode which comprises a first contact portion electrically connected with the first switching element and a first strip electrode extended from the first contact portion with a first length, a second pixel electrode which comprises a second contact portion electrically connected with the second switching element and located on a same straight line with the first contact portion and a second strip electrode extended from the second contact portion with a second length equal to the first length, and a third pixel electrode which comprises a third contact portion electrically connected with the third switching element and disposed at a position displaced from the same straight line of the first contact portion and a third strip electrode extended from the third contact portion with a third length different from the first length; a second substrate comprising a first color filter opposed to the first pixel electrode, a second color filter opposed to the second pixel electrode, and a third color filter opposed to the third pixel electrode; and a liquid crystal layer held between the first substrate and the second substrate.

The embodiments will be hereinafter described with reference to the accompanying drawings. In the drawings, constituent elements having like or similar functions are denoted by the same reference numbers or symbols and their duplicated explanation is omitted.

FIG. 1 is a view schematically showing a configuration and an equivalent circuit, of a liquid crystal display panel LPN which constitutes a liquid crystal display device of the embodiments.

More specifically, the liquid crystal display device comprises an active-matrix-type liquid crystal display panel LPN. The liquid crystal display panel LPN comprises an array substrate AR which is a first substrate, a counter-substrate CT which is a second substrate disposed to be opposed to the array substrate AR, and a liquid crystal layer LQ held between the array substrate AR and the counter-substrate CT. The liquid crystal display panel LPN includes an active area ACT where an image is displayed. The active area ACT corresponds to a region where the liquid crystal layer LQ is held between the array substrate AR and the counter-substrate CT, is formed in a rectangular shape, for example, and is composed of a plurality of pixels PX arrayed in a matrix.

The array substrate AR comprises gate lines G (G1 to Gn), source lines S (S1 to Sm), switching elements SW, pixel electrodes PE, common electrodes CE, etc., in the active area ACT. Each of the gate lines G (G1 to Gn) is substantially extended along a first direction X and arranged in a second direction Y intersecting the first direction X. Each of the source lines S (S1 to Sm) is substantially extended along the second direction Y and arranged in the first direction X. The gate lines G and the source lines S may be bent in accordance with a pixel layout or a pixel shape as explained below. The switching element SW is electrically connected to the gate line G and the source line S in each pixel PX. The pixel electrode PE is electrically connected to the switching element SW in each pixel PX. The common electrode CE is formed commonly for a plurality of pixels PX and is opposed to each pixel electrode PE, in the active area ACT. A storage capacitor CS is formed, for example, between the common electrode CE and the pixel electrode PE.

Each of the gate lines G is led to the outside of the active area ACT and is connected to a first driving circuit GD. Each of the source lines S is led to the outside of the active area ACT and is connected to a second driving circuit SD. For example, at least parts of the first driving circuit GD and second driving circuit SD are formed on the array substrate AR, and are connected with a driving IC chip 2. The driving IC chip 2 incorporates a controller which controls the first driving circuit GD and the second driving circuit SD, and functions as a signal supply source which supplies signals necessary for driving the liquid crystal display panel LPN. In the example illustrated, the driving IC chip 2 is mounted on the array substrate AR, outside the active area ACT. The common electrode CE is led to the outside of the active area ACT and is connected to a power supply module VS. The power supply module VS supplies a common potential to the common electrode CE.

Figure 2:
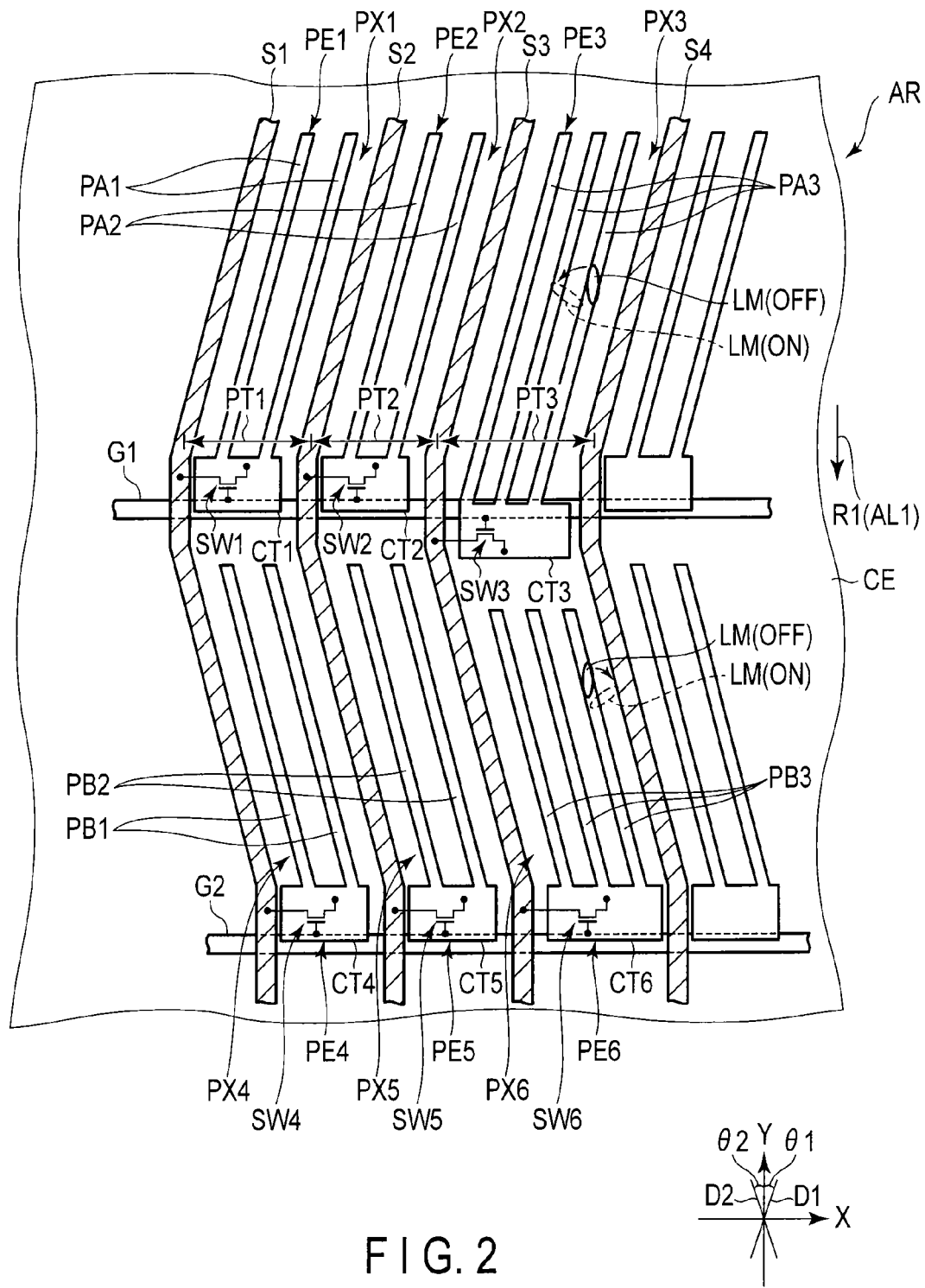
FIG. 2 is a schematic plan view showing a first configuration example of pixels in an array substrate AR shown in FIG. 1 as seen from a counter-substrate side.

FIG. 2 is a schematic plan view showing a first configuration example of the pixels in the array substrate AR shown in FIG. 1 as seen from the counter-substrate side. A pixel structure to which a lateral electric mode is applied is exemplified here, and main portions necessary for explanations alone are illustrated in the figure.

The array substrate AR comprises the gate lines G1 and G2, the source lines S1 to S4, the switching elements SW1 to SW6, the common electrode CE, the pixel electrodes PE1 to PE6, a first alignment film AL1, etc.

Each of the gate lines G1 and G2 is extended linearly along the first direction X. Each of the source lines S1 to S4 is substantially extended along the second direction Y and intersects the gate lines G1 and G2. A pitch PT1 between the source line S1 and the source line S2 is substantially equal to a pitch PT2 between the source line S2 and the source line S3. A pitch PT3 between the source line S3 and the source line S4 is longer than pitch PT1 and pitch PT2.

The pixels PX1 to PX3 arranged in the first direction X are color pixels of different colors, and the pixels PX4 to PX6 are also color pixels of different colors. The pixels PX1 and PX4 arranged in the second direction Y are pixels of the same color and, for example, red (R) pixels. The pixels PX2 and PX5 arranged in the second direction Y are pixels of the same color and, for example, green (G) pixels. The pixels PX3 and PX6 arranged in the second direction Y are pixels of different colors and, for example, the pixel PX3 is a blue (B) pixel and the pixel PX6 is a white (W) pixel. The pixels PX1 and PX4 are located between the source line S1 and the source line S2. The pixels PX2 and PX5 are located between the source line S2 and the source line S3. The pixels PX3 and PX6 are located between the source line S3 and the source line S4.

The pixels PX1 to PX3 are extended in a first extending direction D1 that intersects the second direction Y clockwise at an acute angle. Each of the source lines S1 to S4 located on both sides of the pixels PX1 to PX3 is extended in the first extending direction D1. The pixels PX4 to PX6 are extended in a second extending direction D2 that intersects the second direction Y counterclockwise at an acute angle. Each of the source lines S1 to S4 located on both sides of the pixels PX4 to PX6 is extended in the second extending direction D2. An angle θ1 made by the second direction Y and the first extending direction D1 is substantially the same as an angle θ2 made by the second direction Y and the second extending direction D2.

The common electrode CE is extended over a substantially entire region of the array substrate AR and is formed commonly to the pixels PX1 to PX6. In other words, the common electrode CE is extended in the second direction Y over the gate lines G1 and G2, extended in the first direction X over the source lines S1 to S4, and disposed in each of the pixels PX1 to PX6. It should be noted that in the common electrode CE, an opening portion for making an electric connection between the pixel electrode and the switching element is formed in each of the pixels PX1 to PX6.

The Pixel PX1 comprises the switching element SW1 and the pixel electrode PE1. The switching element SW1 is electrically connected with the gate line G1 and the source line S1. The pixel electrode PE1 is located between the source line S1 and the source line S2, and is electrically connected with the switching element SW1.

The pixel PX2 comprises the switching element SW2 and the pixel electrode PE2. The switching element SW2 is electrically connected with the gate line G1 and the source line S2. The pixel electrode PE2 is located between the source line S2 and the source line S3, and is adjacent to the pixel electrode PE1. In addition, the pixel electrode PE2 is electrically connected with the switching element SW2.

The Pixel PX3 comprises the switching element SW3 and the pixel electrode PE3. The switching element SW3 is electrically connected with the gate line G1 and the source line S3. The pixel electrode PE3 is located between the source line S3 and the source line S4, and is adjacent to the pixel electrode PE2. In addition, the pixel electrode PE3 is electrically connected with the switching element SW3.

Similarly, the pixel PX4 comprises the switching element SW4 electrically connected with the gate line G2 and the source line S1, and the pixel electrode PE4 electrically connected with the switching element SW4. The pixel PX5 comprises the switching element SW5 electrically connected with the gate line G2 and the source line S2, and the pixel electrode PE5 electrically connected with the switching element SW5. The pixel PX6 comprises the switching element SW6 electrically connected with the gate line G2 and the source line S3, and the pixel electrode PE6 electrically connected with the switching element SW6.

Each of the switching elements SW1 to SW6 is, for example, a thin-film transistor (TFT).

Each of the pixel electrodes PE1 to PE6 is opposed to the common electrode CE.

Each of the pixel electrodes PE1 to PE3 is formed in an island shape corresponding to the pixel shape extending in the first extending direction D1. The pixel electrode PE1 comprises a contact portion CT1 electrically connected with the switching element SW1 and at least one strip electrode PA1 extending from the contact portion CT1. The pixel electrode PE2 comprises a contact portion CT2 electrically connected with the switching element SW2 and at least one strip electrode PA2 extending from the contact portion CT2. The pixel electrode PE3 comprises a contact portion CT3 electrically connected with the switching element SW3 and at least one strip electrode PA3 extending from the contact portion CT3.

The contact portion CT2 is arranged with the contact portion CT1 on the same straight line along the first direction X. The contact portion CT3 is located at a position displaced from the same straight line of the contact portion CT1. The contact portion CT3 is located on a side closer to gate line G2 than the contact portion CT1 and the contact portion CT2. In the example illustrated, the contact portion CT3 is located on a side opposite to the contact portion CT1 and the contact portion CT2 with gate line G1 disposed therebetween.

Each of the strip electrodes PA1 to PA3 is extended in the first extending direction D1. In other words, the strip electrode PA1 is extended from the contact portion CT1 toward a side apart from the gate line G2. Similarly, the strip electrode PA2 is extended from the contact portion CT2 toward a side apart from the gate line G2. The strip electrode PA2 has the same length as the strip electrode PA1. The strip electrode PA3 is extended from the contact portion CT3 toward a side apart from the gate line G2. The strip electrode PA3 has a length different from the length of s the trip electrode PA1, etc., and has a greater length than the length of the strip electrode PA1 in the example illustrated. In other words, a full length of the pixel electrode PE3 along the first extending direction D1 is greater than a full length of each of the pixel electrodes PE1 and PE2 along the first extending direction D1.

The number of strip electrodes PA1 is the same as the number of strip electrodes PA2, and the number of strip electrodes PA3 is greater than the number of strip electrodes PA1. In the example illustrated, the pixel electrode PE1 comprises two strip electrodes PA1 arranged in the first direction X, the pixel electrode PE2 comprises two strip electrodes PA2 arranged in the first direction X, and the pixel electrode PE3 comprises three strip electrodes PA3 arranged in the first direction X.

Each of the pixel electrodes PE4 to PE6 is formed in an island shape corresponding to the pixel shape expending in the second extending direction D2. The pixel electrode PE4 comprises a contact portion CT4 electrically connected with the switching element SW4, and at least one strip electrode PB1 extending from the contact portion CT4. The pixel electrode PE5 comprises a contact portion CT5 electrically connected with the switching element SW5 and at least one strip electrode PB2 extending from the contact portion CT5. The pixel electrode PE6 comprises a contact portion CT6 electrically connected with the switching element SW6 and at least one strip electrode PB3 extending from the contact portion CT6. The contact portions CT1 to CT3 are arranged on the same straight line along the first direction X.

Each of the strip electrodes PB1 to PB3 is extended in the second extending direction D2. In other words, the strip electrode PB1 is extended from the contact portion CT4 toward a side close to the gate line G1. Similarly, the strip electrode PB2 is extended from the contact portion CT5 toward a side close to the gate line G1. The strip electrode PB2 has the same length as the strip electrode PB1. The strip electrode PB3 is extended from the contact portion CT6 toward a side close to the gate line G1. The strip electrode PB3 has a length different from the length of the strip electrode PB1, etc., and has a smaller length than the length of the strip electrode PB1 in the example illustrated. In other words, a full length of the pixel electrode PE6 along the second extending direction D2 is smaller than a full length of each of the pixel electrodes PE4 and PE5 along the second extending direction D2.

The number of strip electrodes PB1 is the same as the number of strip electrodes PB2, and the number of strip electrodes PB3 is greater than the number of strip electrodes PB1. In the example illustrated, the pixel electrode PE4 comprises two strip electrodes PB1 arranged in the first direction X, the pixel electrode PE5 comprises two strip electrodes PB2 arranged in the first direction X, and the pixel electrode PE6 comprises three strip electrodes PB3 arranged in the first direction X.

The first alignment film AL1 is subjected to alignment treatment along a direction which intersects the first extending direction D1 and the second extending direction D2 at an acute angle less than or equal to 45°. For example, an alignment direction R1 of the first alignment film AL1 is a direction which is parallel to the second direction Y and which intersects the first extending direction D1 or the second extending direction D2.

FIG. 3 is a plan view schematically showing a structural example of the switching elements SW2 and SW3 shown in FIG. 2. In the example illustrated, each of the switching elements SW2 and SW3 is formed of a thin-film transistor in the double-gate structure.

In other words, the switching element SW2 comprises a semiconductor layer SC2 and a relay electrode RE2. The semiconductor layer SC2 is formed in a U-letter shape and intersects the gate line G1 at two parts. One of end sides of the semiconductor layer SC2 is connected to the source line S2 through a contact hole CH11. The other end side of the semiconductor layer SC2 is connected to the relay electrode RE2 through a contact hole CH12. The relay electrode RE2 overlaps the contact portion CT2 of the pixel electrode PE2, and is connected to the contact portion CT2 through a contact hole 13. The contact portion CT2 is located on the same side as the strip electrodes PA2 with respect to the gate line G1.

The switching element SW3 comprises a semiconductor layer SC3 and a relay electrode RE3. The semiconductor layer SC3 is formed in a U-letter shape and intersects the gate line G1 at two parts. One of end sides of the semiconductor layer SC3 is connected to the source line S3 through a contact hole CH21. The other end side of the semiconductor layer SC3 is connected to the relay electrode RE3 through a contact hole CH22. The relay electrode RE3 overlaps the contact portion CT3 of pixel electrode PE3, and is connected to the contact portion CT3 through a contact hole CH23. The contact portion CT3 is located on a side opposite to the strip electrodes PA3 with respect to the gate line G1.

In the example illustrated, the semiconductor layer SC3 is formed to face in a direction opposite to the semiconductor layer SC2. In other words, the semiconductor layer SC2 is folded on a side closer to the pixel electrode PE2 than to the gate line G1 and is connected to each of the source line S2 and the relay electrode RE2 on a side apart from the pixel electrode PE2 than from the gate line G1. In contrast, the semiconductor layer SC3 is folded on a side apart from the pixel electrode PE3 than from the gate line G1 and is connected to each of the source line S3 and the relay electrode RE3 on a side closer to the pixel electrode PE3 than to the gate line G1. In other words, the contact holes CH11 and CH12 are located on a side opposite to the contact holes CH21 and CH22 with respect to the gate line G1. In addition, the contact hole CH13 is also located on a side opposite to the contact hole CH23 with respect to the gate line G1. Alternatively, as seen from another viewpoint, an imaginary straight line L linking the contact hole CH13 formed at the contact portion CT2 and the contact hole CH23 formed at the contact portion CT3 intersects the gate line G1.

It should be noted that the semiconductor layers SC2 and SC3 are formed of, for example, polycrystalline silicon (p-Si) but may be formed of amorphous silicon (a-Si), an oxide semiconductor, or the like.

Figure 4:
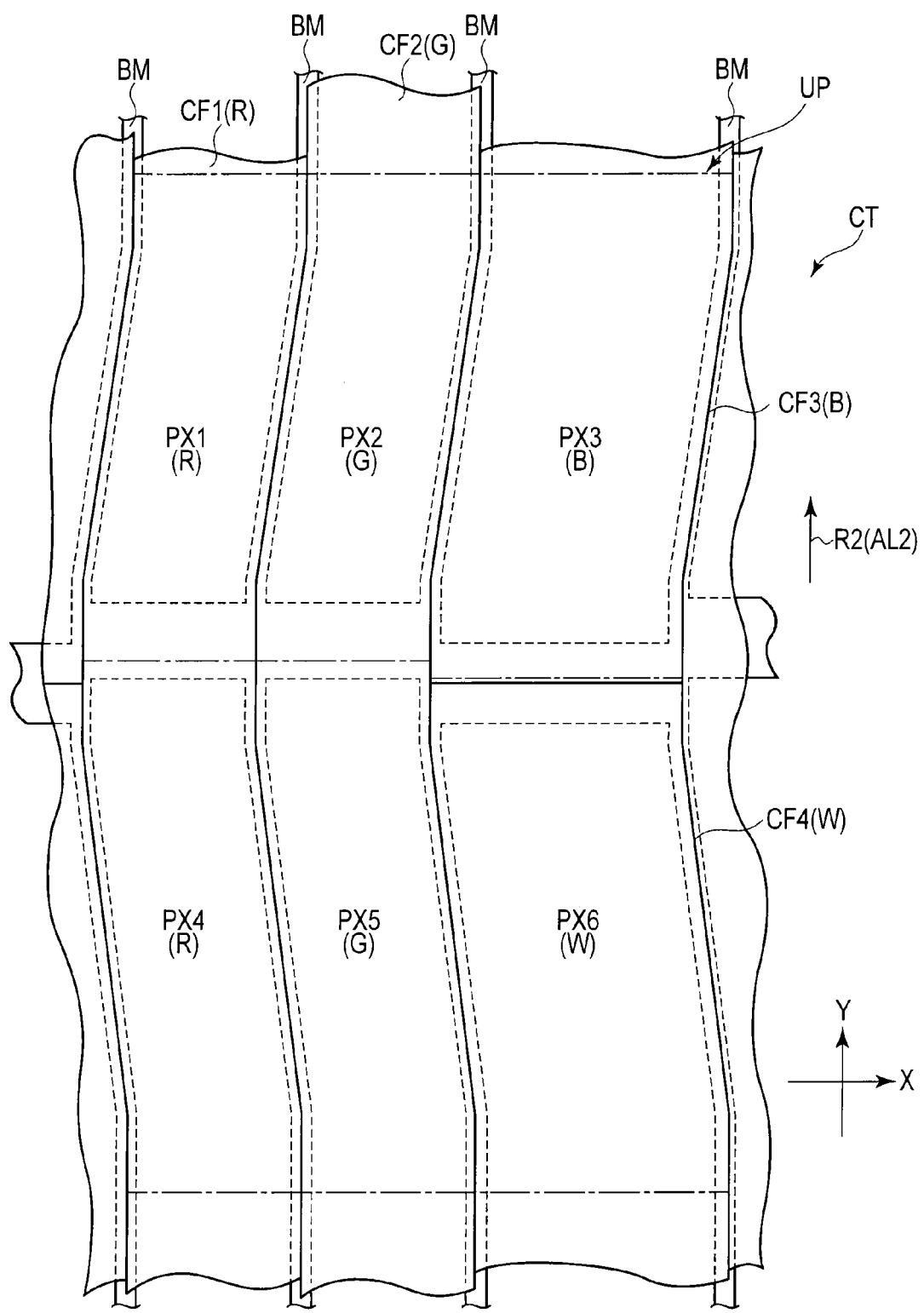
FIG. 4 is a plan view schematically showing an example of a layout of each pixel and color filters in the embodiments.

FIG. 4 is a plan view schematically showing an example of a layout of the pixels and color filters in the embodiments.

A unit pixel UP for implementing color display is composed of a plurality of different color pixels. The unit pixel UP is a minimum unit that forms a color image displayed in the active area. The unit pixel UP is composed of, for example, six color pixels. The unit pixel UP is composed of the pixels PX1 to PX6. In the figure, each pixel is indicated by a one-dot-chained line.

As explained above, the pixels PX1 and PX4 are red pixels, the pixels PX2 and PX5 are green pixels, the pixel PX3 is a blue pixel, and the pixel PX6 is a white pixel. In this configuration, the pixels PX1, PX2, PX4 and PX5 are substantially equal in area. The area of the pixel PX3 is larger than the area of the pixel PX1, etc.

The counter-substrate CT comprises light-shielding layers BM, color filters CF1 to CF4, a second alignment film AL2, etc.

The light-shielding layers BM are disposed at boundaries of the respective pixels. In other words, the light-shielding layers BM are located above wiring portions such as the source lines, the gate lines, the switching elements, etc., shown in FIG. 2. In the example shown in FIG. 2, the contact portion CT3 (or the switching element SW3) is displaced from a position on the same straight line in which the contact portion CT1 (or the switching element SW1) and the contact portion CT2 (or the switching element SW2) are arranged. For this reason, a portion extending in the first direction X, of the light-shielding layer BM shown in the figure, meanders in accordance with the layout of the array substrate AR. The light-shielding layer BM is disposed at a boundary between the pixels of different colors, but may not be disposed at a boundary between the pixels of the same color.

The color filter CF1 is formed in a strip shape extending along the second direction Y. The color filter CF2 is adjacent to the color filter CF1 in the first direction X and is formed in a strip shape extending along the second direction Y. The color filter CF3 is adjacent to the color filter CF2 in the first direction X and is formed in an island shape. The color filter CF4 is adjacent to the color filter CF3 in the second direction Y and adjacent to the color filter CF2 in the first direction X, and is formed in an island shape. The color filter CF3 and the color filter CF4 are alternately disposed along the second direction Y.

The color filter CF1 is disposed to correspond to the pixels PX1 and PX4. The color filter CF2 is disposed to correspond to the pixels PX2 and PX5. The color filter CF3 is disposed to correspond to the pixel PX3. The color filter CF4 is disposed to correspond to the pixel PX6. In the example illustrated, the color filter CF1 is a red (R) color filter, the color filter CF2 is a green (G) color filter, the color filter CF3 is a blue (B) color filter, and the color filter CF4 is a white (W) color filter. The color filters CF1 to CF4 have mutually adjacent end portions overlapping the light-shielding layers BM.

The second alignment film AL2 is subjected to alignment treatment along a direction parallel to the alignment direction R1 of the first alignment film AL1. An alignment direction R2 of the second alignment film AL2 is, for example, mutually opposed to the alignment direction R1 of the first alignment film AL1.

Figure 5:
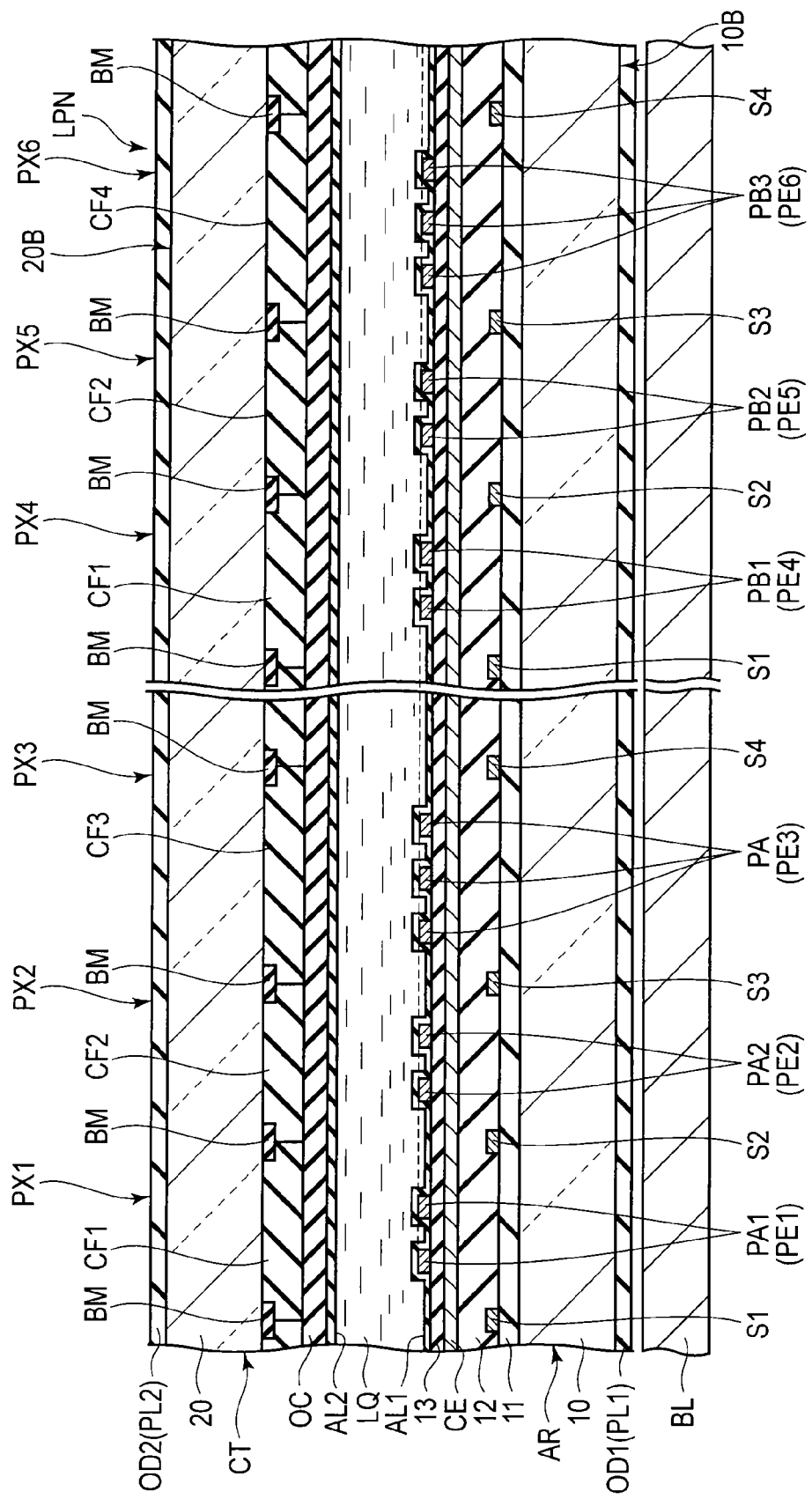
FIG. 5 is a cross-sectional view schematically showing a configuration of a liquid crystal display panel LPN including pixels PX1 to PX6 shown in FIG. 2.

FIG. 5 is a cross-sectional view schematically showing a configuration of the liquid crystal display panel LPN including the pixels PX1 to PX6 shown in FIG. 2.

The array substrate AR is formed by using a first insulating substrate 10 having light transmissivity, such as a glass substrate and a resin substrate. The array substrate AR comprises the source lines S1 to S4, the common electrode CE, the pixel electrodes PE1 to PE6, a first insulating film 11, a second insulating film 12, a third insulating film 13, the first alignment film AL1, etc., on a side of the first insulating substrate 10 which is opposed to the counter-substrate CT. It should be noted that the switching elements or the gate lines are not shown in the figure.

The source lines S1 to S4 are formed on the first insulating film 11 and covered with the second insulating film 12. The gate lines are formed between the first insulating substrate 10 and the first insulating film 11. The common electrode CE is formed on the second insulating film 12 and covered with the third insulating film 13. The common electrode CE is formed of a transparent, electrically conductive material such as indium tin oxide (ITO) and indium zinc oxide (IZO).

The pixel electrodes PE1 to PE6 are formed on the third insulating film 13 and opposed to the common electrode CE. In other words, the strip electrodes PA1 to PA3 and the strip electrodes PB1 to PB3 are located above the common electrode CE through the third insulating film 13. The third insulating film 13 corresponds to an interlayer insulating film which is interposed between the common electrode CE and the pixel electrodes PE1 to PE6. The pixel electrodes PE1 and PE4 are located between the source lines S1 and S2. The pixel electrodes PE2 and PE5 are located between the source lines S2 and S3. The pixel electrodes PE3 and PE6 are located between the source lines S3 and S4. The pixel electrodes PE1 to PE6 are formed of, for example, a transparent, electrically conductive material such as ITO and IZO. The pixel electrodes PE1 to PE6 are covered with the first alignment film AL1. The first alignment film AL1 also covers the third insulating film 13. The first alignment film AL1 is formed of a material having a horizontal alignment property and disposed on a surface of the array substrate AR which is in contact with the liquid crystal layer LQ.

In contrast, the counter-substrate CT is formed by using a second insulating substrate 20 having light transmissivity, such as a glass substrate and a resin substrate. The counter-substrate CT comprises the light-shielding layers BM, the color filters CF1 to CF4, an overcoat layer OC, the second alignment film AL2, etc. on a side of the second insulating substrate 20 which is opposed to the array substrate AR.

The light-shielding layers BM are formed on an inner surface of the second insulating substrate 20. The light-shielding layers BM are located above the source lines S1 to S4, respectively. The light-shielding layers BM are formed of a black resin material or a light-shielding metal material.

Each of the color filters CF1 to CF4 is formed on the inner surface of the second insulating substrate 20. The color filter CF1 is opposed to the pixel electrodes PE1 and PE4. The color filter CF2 is opposed to the pixel electrodes PE2 and PE5. The color filter CF3 is opposed to the pixel electrode PE3. The color filter CF4 is opposed to the pixel electrode PE6. The color filter CF1 is formed of a red-colored resin material. The color filter CF2 is formed of a green-colored resin material. The color filter CF3 is formed of a blue-colored resin material. The color filter CF4 is formed of a white (or transparent) resin material. The color filter CF4 may not be disposed, may not be a strictly achromatic color filter, or may be a color filter of a pale color (for example, pale yellow or pale blue). Boundaries between the color filters of different colors overlap the light-shielding layers BM above the source lines S.

The overcoat layer OC covers the color filters CF1 to CF4. The overcoat layer OC flattens unevenness of the surfaces of color filters CF1 to CF4. The overcoat layer OC is formed of a transparent resin material. The overcoat layer OC is covered with the second alignment film AL2. The second alignment film AL2 is formed of a material having a horizontal alignment property and is disposed on a surface of the counter-substrate CT which is in contact with the liquid crystal layer LQ.

The array substrate AR and the counter-substrate CT as explained above are disposed such that the first alignment film AL1 and the second alignment film AL2 face each other. At this time, a predetermined cell gap is formed between the array substrate AR and the counter-substrate CT by a columnar spacer formed on one of the substrates. The array substrate AR and the counter-substrate CT are applied to each other by a sealing member in a state in which the cell gap is formed. The liquid crystal layer LQ is formed by a liquid crystal material containing liquid crystal molecules LM sealed between the first alignment film AL1 and the second alignment film AL2.

A backlight unit BL is disposed on a back side of the liquid crystal display panel LPN having such the above-described structure. Various types can be applied as the backlight unit BL, but explanation of a detailed structure of the backlight unit BL is omitted here.

A first optical element OD1 including a first polarizer PL1 is disposed on an outer surface 10B of the first insulating substrate 10. A second optical element OD2 including a second polarizer PL2 is disposed on an outer surface 20B of the second insulating substrate 20. The first polarizer PL1 and the second polarizer PL2 are disposed to be, for example, in a positional relationship of crossed-Nicol in which polarization axes of the respective polarizers cross each other at right angles.

Next, the operation of the liquid crystal display device having the above-explained configuration will be explained.

At an OFF state at which a voltage is not applied between the pixel electrode PE and the common electrode CE to form a potential difference, no voltage is applied to the liquid crystal layer LQ. In other words, an electric field is not formed between the pixel electrode PE and the common electrode CE. For this reason, the liquid crystal molecules LM included in the liquid crystal layer LQ are initially aligned in an X-Y plane by an alignment restriction force of the first alignment film AL1 and the second alignment film AL2, as illustrated by a solid line in FIG. 2. In other words, the initial alignment direction of the liquid crystal molecules LM is parallel to the second direction Y. At the OFF state, part of the light from the backlight unit BL passes through the first polarizer PL1 and enters the liquid crystal display panel LPN. The light incident on the liquid crystal display panel LPN is linearly polarized light orthogonal to, for example, a first absorption axis of the first polarizer PL1. The polarized state of the linearly polarized light is hardly varied when the light passes through the liquid crystal display panel LPN at the OFF state. For this reason, most part of the linearly polarized light passing through the liquid crystal display panel LPN is absorbed by the second polarizer PL2 (black display).

At an ON state at which a voltage is applied between the pixel electrode PE and the common electrode CE to form a potential difference, a voltage is applied to the liquid crystal layer LQ. In other words, a fringing field is formed between the pixel electrode PE and the common electrode CE. For this reason, the liquid crystal molecules LM are aligned in a direction different from a direction of the initial alignment in the X-Y plane, as illustrated by a broken line in FIG. 2. In a positive-type liquid crystal material, for example, the liquid crystal molecules LM of the pixel PX3 are rotated counterclockwise to be aligned in a direction approximately parallel to the fringing field, in the X-Y plane, and the liquid crystal molecules LM of the pixel PX6 are rotated clockwise to be aligned in a direction approximately parallel to the fringing field, in the X-Y plane. At this time, the liquid crystal molecules LM are aligned in a direction corresponding to a magnitude of the electric field. At the ON state, linearly polarized light orthogonal to the first absorption axis of the first polarizer PL1 is made incident on the liquid crystal display panel LPN, and the polarized state is varied in accordance with the aligned state of the liquid crystal molecules LM when the light passes through the liquid crystal layer LQ. For this reason, at least part of the light passing through the liquid crystal layer LQ is transmitted through the second polarizer PL2 at the ON state (white display).

In such a structure, a normally black mode is implemented.

As explained above, if the unit pixel UP is composed of six color pixels of two rows×three columns, each of the six color pixels is allocated to any one of a red pixel, a green pixel, a blue pixel, and a white pixel. For example, two color pixels in a column are allocated as the red pixels, and two color pixels in a column are allocated as the green pixels. In addition, the color pixels in a column are allocated as the blue pixel and the white pixel, respectively.

In other words, in the unit pixel UP of the layout explained in the embodiments, two color pixels are allocated as the red pixels and two color pixels are allocated as the green pixels while one color pixel is allocated as the blue pixel and one color pixel is allocated as the white pixel. If each of all the six pixels has an equal area, brightness of the blue pixel is insufficient. For this reason, the area of the blue pixel is increased and the brightness necessary for the blue pixel is maintained by making the length of the blue pixel in the first direction X greater than the length of each of the red pixels and green pixels in the first direction X.

In contrast, if the length of the unit pixel UP in the first direction X is restricted in response to a demand for higher fineness, adjusting the area of each of the color pixels by the length of each of the color pixels along the first direction X alone is limited. For this reason, the red pixels and the green pixels need to be driven at a comparatively low brightness to maintain optimum color balance. In addition, as the difference in lengths of the color pixels along the first direction X is greater, a proportion in areas of the color pixels in the unit pixel UP is varied more greatly and inconvenience of losing the color balance further occurs when misalignment occurs in the first direction X in the step of bonding the array substrate AR and the counter-substrate CT.

Thus, according to the embodiments, the contact portion of one pixel electrode, of three pixel electrodes arranged in the first direction X, is disposed at a position displaced from the same straight line of contact portions of two other pixel electrodes. For example, in the blue pixel, the pixel electrode and the switching element are electrically connected at positions displaced from the same straight line of the red pixels and green pixels. At this time, the pixel electrode of the blue pixel protrudes toward the white pixel side, and the contact portion of the pixel electrode is close to the pixel electrode of the white pixel. Thus, the area of the blue pixel contributing to the display can be expanded in the columnar direction (or second direction Y). For this reason, the brightness of the blue pixel can be enhanced. An optimum color balance can be thereby obtained with higher brightness, in the unit pixel UP. In addition, since the difference in lengths of the color pixels in the first direction X does not become great, variation in color balance corresponding to the misalignment in bonding the array substrate AR and the counter-substrate CT can be suppressed. Display quality can be therefore enhanced.

Furthermore, in the unit pixel UP, the area of each color pixel can be adjusted in accordance with the length of the first direction X and length of the second direction Y, and the degree of freedom in the layout can be improved.

In the above-described embodiments, the shape-modified layout in which the pitches of the red pixels and the green pixels are equal to each other and the pitches of the blue pixel and the white pixel are greater than the pitches of the red pixels and the green pixels has been explained, but, in the shape-modified layout, the color pixels may be combined in a different manner from that mentioned above and all the pitches of the red pixels, green pixels, blue pixel and white pixel may be different from each other. The pixel electrode disposed in each of the color pixels needs only to comprise an arbitrary number of strip electrodes that is set in accordance with each pixel pitch, and is not limited to the above-explained example.

Next, another configuration example will be explained.

Figure 6:
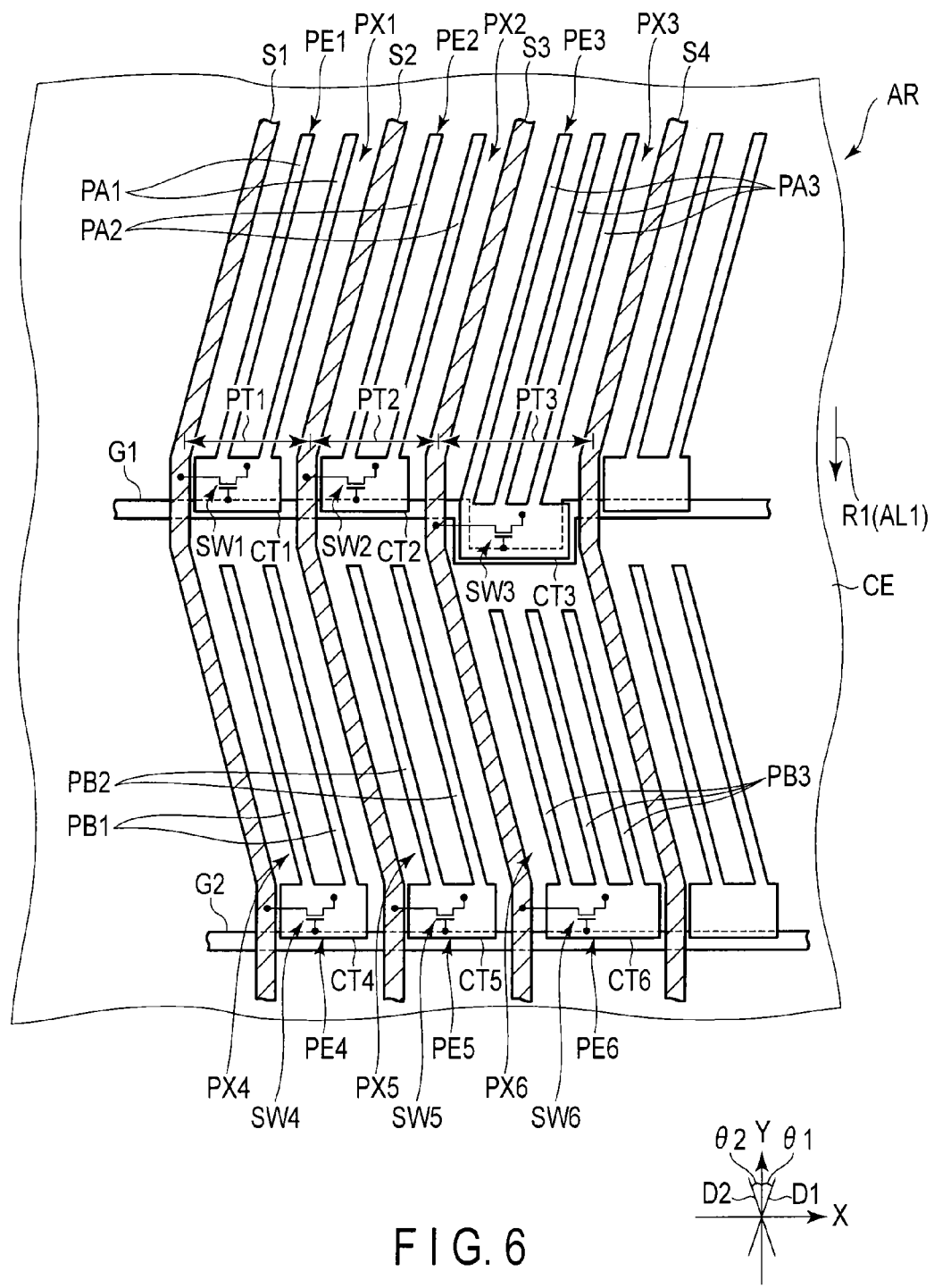
FIG. 6 is a schematic plan view showing a second configuration example of the pixels in the array substrate AR shown in FIG. 1 as seen from the counter-substrate side.

FIG. 6 is a schematic plan view showing a second configuration example of the pixels in the array substrate AR shown in FIG. 1 as seen from the counter-substrate side.

The second configuration example is different from the first configuration example shown in FIG. 2 with respect to a feature that gate line G1 is bent in part. The other constituent features are the same as those in the first configuration example, and explanations are omitted.

In the example illustrated, similarly to the first configuration example, the contact portions CT1 and CT2 are arranged on the same straight line along the first direction X while the contact portion CT3 is disposed at a position displaced from the same straight line of the contact portion CT1, and the pixel electrode PE3 is expanded toward the pixel electrode PE6 along the second direction Y.

The gate line G1 is extended linearly along the first direction X in accordance with the contact portions CT1 and CT2, and bent to a side apart from the strip electrodes PA3 in accordance with the contact portion CT3 or a side close to the pixel electrode PE6. In other words, the contact portion CT3 is located on the same side as the strip electrodes PA3 with respect to the gate line G1, in the pixel electrode PE3. In addition, the contact portion CT3 is located on the same side as the contact portions CT1 and CT2 with respect to the gate line G1. The gate line G1 is electrically connected with each of the switching elements SW1 to SW3. The switching elements SW1 to SW3 are electrically connected with the pixel electrodes PE1 to PE3, respectively.

In the second configuration example, too, the area contributing to display of pixel PX3 can be increased in the second direction Y, and the same advantage as the first configuration example can be obtained. In addition, in the second configuration example, the switching elements SW1 to SW3 can be connected with the pixel electrodes PE1 to PE3, in the same direction, even in a layout in which the contact portions CT1 to CT3 are not located in the same straight line. In other words, the switching element SW3 has a structure different from the switching element SW2, etc., in the first configuration example, as shown in FIG. 3, while the switching elements SW1 to SW3 can be formed in the same structure irrespective of the positions of the respective contact portions CT1 to CT3, in the second configuration example.

Figure 7:
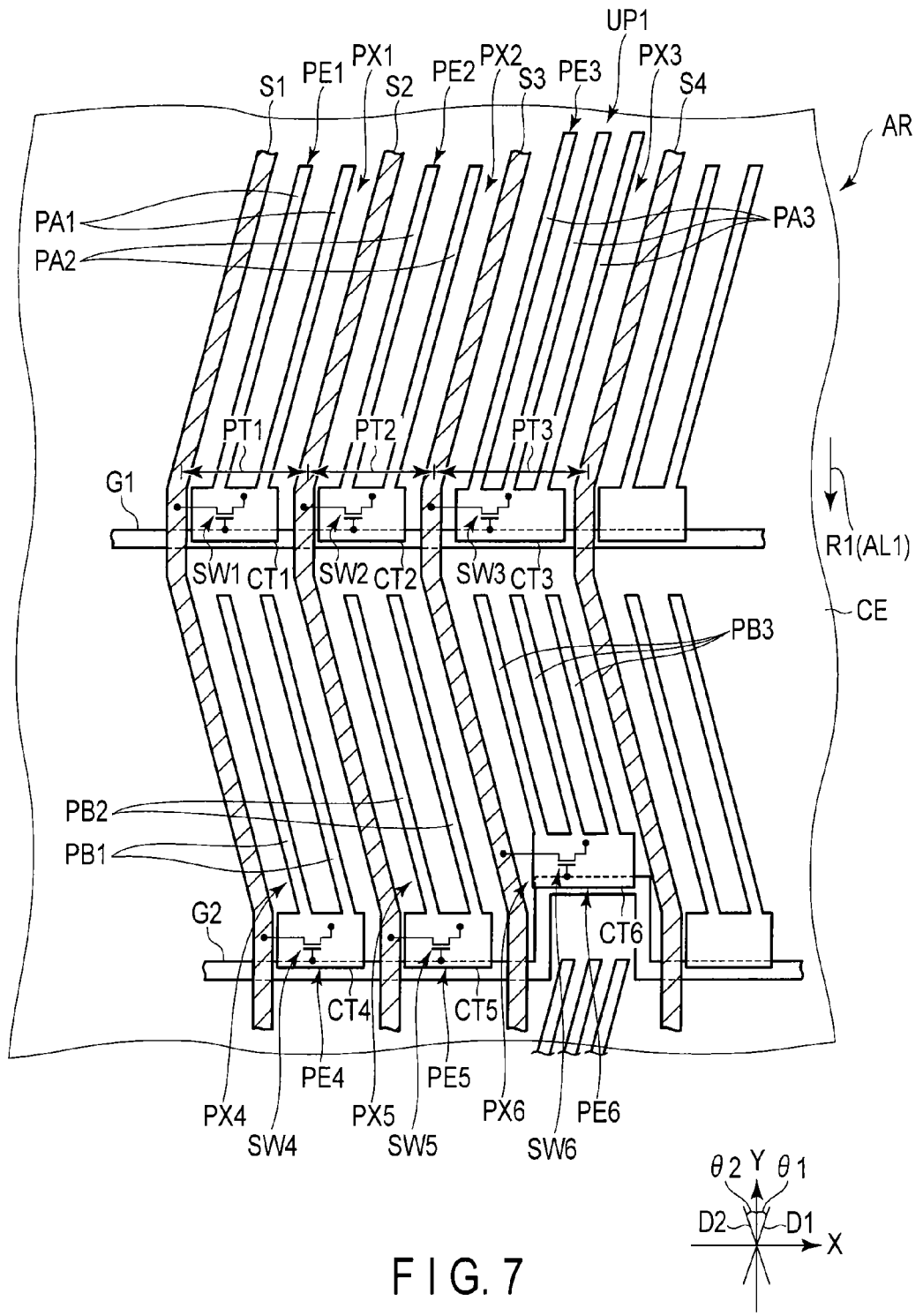
FIG. 7 is a schematic plan view showing a third configuration example of the pixels in the array substrate AR shown in FIG. 1 as seen from the counter-substrate side.

FIG. 7 is a schematic plan view showing a third configuration example of the pixels in the array substrate AR shown in FIG. 1 as seen from the counter-substrate side.

The third configuration example shown in the figure is different from the first configuration example shown in FIG. 2 with respect to features that the contact portions CT1 to CT3 are arranged in the same straight light along the first direction X and the strip electrodes PA3 are formed to be longer than the strip electrodes PA1 and PA2, and that the contact portion CT6 is disposed at a position displaced from the same straight line of the contact portions CT4 and CT5.

In the example illustrated, the contact portions CT4 and CT5 are arranged in the same straight line along the first direction X while the contact portion CT6 is disposed at a position displaced from the same straight line of the contact portions CT4 and CT5, and the pixel electrode PE6 is eccentrically disposed toward the pixel electrode PE3 along the second direction Y. The strip electrodes PB1 and PB2 have an equal length while the strip electrode PB3 has a shorter length than the strip electrode PB1.

The gate line G2 is extended linearly along the first direction X in accordance with the contact portions CT4 and CT5, and bent to the pixel electrode PE3 side in accordance with the contact portion CT6. The gate line G2 is electrically connected with each of the switching elements SW4 to SW6. The switching elements SW4 to SW6 are electrically connected with the pixel electrodes PE4 to PE6, respectively.

The gate line G1 is extended linearly along the first direction X in accordance with the contact portions CT1 to CT3. The gate line G1 is electrically connected with each of the switching elements SW1 to SW3. The switching elements SW1 to SW3 are electrically connected with the pixel electrodes PE1 to PE3, respectively.

The unit pixels UP shown in the figure are repeatedly disposed in the second direction Y. In other words, tip portions of strip electrodes PA3 are extended toward the bent portion of the gate line G2.

In the third configuration example, too, the area contributing to display of pixel PX3 can be increased in the second direction Y, and the same advantage as the first configuration example can be obtained.

According to the embodiments, as described above, the liquid crystal display device capable of enhancing the display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
a first substrate comprising first to third switching elements, a gate line electrically connected with the first to third switching elements, a first pixel electrode which comprises a first contact portion electrically connected with the first switching element and a first strip electrode extended from the first contact portion with a first length, a second pixel electrode which comprises a second contact portion electrically connected with the second switching element and located on a same straight line with the first contact portion and a second strip electrode extended from the second contact portion with a second length equal to the first length, and a third pixel electrode which comprises a third contact portion electrically connected with the third switching element and disposed at a position displaced from the same straight line of the first contact portion and a third strip electrode extended from the third contact portion with a third length different from the first length;
a second substrate comprising a first color filter opposed to the first pixel electrode, a second color filter opposed to the second pixel electrode, and a third color filter opposed to the third pixel electrode; and a liquid crystal layer held between the first substrate and the second substrate,
wherein the third contact portion is located on a side opposed to the first and second contact portions with respect to the gate line.

2. The device of claim 1, wherein
the third length is greater than the first length.

3. The device of claim 2, wherein
the third color filter is a blue color filter.

4. The device of claim 1, wherein
the third length is smaller than the first length.

5. The device of claim 4, wherein
the third color filter is a white color filter.

6. The device of claim 1, wherein
the first pixel electrode comprises in first strip electrodes, the second pixel electrode comprises m second strip electrodes, and the third pixel electrode comprises n third strip electrodes, and
m and n are integers greater than or equal to 1 and n is greater than m.

7. The device of claim 1, wherein
the first substrate further comprises a common electrode opposed to the first to third pixel electrodes.

8. The device of claim 1, wherein
each of the first to third switching elements comprises a semiconductor layer and a relay electrode.

9. The device of claim 8, wherein
the relay electrode overlaps the first contact portion and is electrically connected to the first contact portion through a contact hole formed in the first contact portion.

10. A liquid crystal display device comprising:
a first substrate comprising first to third switching elements, a first pixel electrode which comprises a first contact portion electrically connected with the first switching element and a first strip electrode extended from the first contact portion with a first length, a second pixel electrode which comprises a second contact portion electrically connected with the second switching element and located on a same straight line with the first contact portion and a second strip electrode extended from the second contact portion with a second length equal to the first length, and a third pixel electrode which comprises a third contact portion electrically connected with the third switching element and disposed at a position displaced from the same straight line of the first contact portion and a third strip electrode extended from the third contact portion with a third length different from the first length;
a second substrate comprising a first color filter opposed to the first pixel electrode, a second color filter opposed to the second pixel electrode, and a third color filter opposed to the third pixel electrode; and
a liquid crystal layer held between the first substrate and the second substrate,
wherein
the first substrate further comprises a fourth switching element, and a fourth pixel electrode which comprises a fourth contact portion electrically connected with the fourth switching element and a fourth strip electrode extended from the fourth contact portion with a fourth length different from the first to third lengths, and
the second substrate further comprises a fourth color filter opposed to the fourth pixel electrode.

11. The device of claim 10, wherein
the fourth length is smaller than the third length.

12. The device of claim 11, wherein
the third color filter is a blue color filter and the fourth color filter is a white color filter.

13. The device of claim 10, wherein
the fourth pixel electrode is eccentrically disposed toward the third pixel electrode.

14. The device of claim 10, wherein
the first substrate further comprises a first gate line and a second gate line arranged parallel to the first gate line in a second direction, and
the first gate line is extended linearly along the first to third contact portions, and the second gate line is bent in accordance with the fourth contact portion.

15. The device of claim 10, wherein
each of the first to fourth switching elements comprises a semiconductor layer and a relay electrode.

16. The device of claim 15, wherein
the relay electrode overlaps the first contact portion and is electrically connected to the first contact portion through a contact hole formed in the first contact portion.

17. A liquid crystal display device comprising:
a first substrate comprising first to third switching elements, a first pixel electrode which comprises a first contact portion electrically connected with the first switching element and a first strip electrode extended from the first contact portion with a first length, a second pixel electrode which comprises a second contact portion electrically connected with the second switching element and located on a same straight line with the first contact portion and a second strip electrode extended from the second contact portion with a second length equal to the first length, and a third pixel electrode which comprises a third contact portion electrically connected with the third switching element and disposed at a position displaced from the same straight line of the first contact portion and a third strip electrode extended from the third contact portion with a third length different from the first length;
a second substrate comprising a first color filter opposed to the first pixel electrode, a second color filter opposed to the second pixel electrode, and a third color filter opposed to the third pixel electrode; and
a liquid crystal layer held between the first substrate and the second substrate,
wherein
the first substrate further comprises a gate line, and first to fourth source lines intersecting the gate line, the first switching element is electrically connected with the gate line and the first source line, the second switching element is electrically connected with the gate line and the second source line, and the third switching element is electrically connected with the gate line and the third source line, and
a first pitch between the first source line and the second source line is equal to a second pitch between the second source line and the third source line, and a third pitch between the third source line and the fourth source line is greater than the first pitch.

18. The device of claim 17, wherein
the gate line is extended linearly along a direction.

19. The device of claim 17, wherein
the gate line is extended linearly in accordance with the first contact portion and the second contact portion and bent in accordance with the third contact portion.

* * * * *